United States Patent [19]
Kishida et al.

[11] 4,351,751
[45] Sep. 28, 1982

[54] GLASS FIBER REINFORCED POLYETHYLENE TEREPHTHALATE RESIN COMPOSITION

[75] Inventors: Kazuo Kishida; Isao Sasaki; Hiroshi Mori, all of Ohtake, Japan

[73] Assignee: Mitsubishi Rayon Co., Ltd., Tokyo, Japan

[21] Appl. No.: 217,095

[22] Filed: Dec. 16, 1980

[30] Foreign Application Priority Data

Dec. 27, 1979 [JP] Japan ................................ 54-173011
Aug. 19, 1980 [JP] Japan ................................ 55-113595

[51] Int. Cl.$^3$ ...................... C08L 91/08; C08L 67/02
[52] U.S. Cl. .................................... 524/375; 524/605; 524/494; 524/400; 524/394
[58] Field of Search .............. 260/40 R, 33.2 R, 28 R; 525/4

[56] References Cited

U.S. PATENT DOCUMENTS 4,080,349 3/1978 Wurmb et al. .................... 260/28 R
4,212,791 7/1980 Avery et al. ...................... 260/40 R
4,276,208 6/1981 Ogawa et al. .................... 260/28 R

OTHER PUBLICATIONS

Chem. Abst. 13773g, vol. 74, Sato et al. 1971 p. 24.

*Primary Examiner*—Theodore E. Pertilla
*Attorney, Agent, or Firm*—Cushman, Darby & Cushman

[57] ABSTRACT

Polyethylene terephthalate type resin-containing molding compositions reinforced with glass fibers also containing from 0.03 to 5 weight percent of an organic caboxylic acid metal salt such as sodium stearate and an ether compound such as polyoxyethylene monononylphenyl ether present in an amount of from 0.1 up to 20 weight percent in which the average number of recurring alkylene oxide units is from 5 to 200 are disclosed. Also a solid or liquid paraffin or polyethylene wax may be included in an amount of from 0.3 to 5 weight percent. Moldings made from the disclosed compositions have a uniform appearance and exhibit improved heat resistance.

17 Claims, No Drawings

GLASS FIBER REINFORCED POLYETHYLENE TEREPHTHALATE RESIN COMPOSITION

BACKGROUND OF THE INVENTION

The present invention relates to reinforced resin compositions comprising a polyethylene terephthalate-type resin as the main component. These resins have excellent heat resistance and are uniform in appearance.

Glass fiber-reinforced polyethylene terephthalate resins have substantial commercial applications because of their excellent mechanical characteristics, chemical resistance and other properties. However, these reinforced resins are still insufficient in various points. For example, when a glass fiber-reinforced polyethylene terephthalate resin is molded at a mold temperature less than 100° C., the heat distortion temperature of the molded articles is as low as about 100° C. and the heat resistance is poor. Furthermore, when a molded article non-uniform in the thickness is prepared, the thin portion is semi-transparent and only the very interior is whitened in the thick portion. In such instances the appearance of the molded article is not uniform and the molded article is not preferred from the aesthetic viewpoint. On the other hand, when the molding operation is carried out at a mold temperature greater than about 120° C., the heat distortion temperature of the molded articles is elevated to a level of approximately 230° C., and even molded articles which have thin portions have a white uniform appearance and excellent gloss properties. This means that when high heat resistance and uniform appearance are required, molding is ordinarily carried out at a high mold temperature, for instance of about 130° to 150° C. On the other hand, high temperature molding has certain limitations and disadvantages, primarily economic, which is a serious drawback from the practical viewpoint.

Metal salts of organic carboxylic acids and inorganic compounds have been found to be effective for improving the heat resistance of polyethylene terephthalate resins. Also, it has been shown that the mold temperature dependence of the heat resistance and appearance in polyethylene terephthalate molded articles can be reduced to some extent by incorporation of these additives. More specifically, even when a polyethylene terephthalate resin containing such additives is molded at a low mold temperature, the degree of whitening in the interior of the thick portion of the resulting molded article is increased and also the heat resistance is improved to some extent. However, when a thin molded article is prepared by low temperature molding, if only an additive such as a metal salt of an organic carboxylic acid or an inorganic compound is incorporated, the heat resistance is still insufficient, the appearance is semi-transparent or the interior is whitened only slightly. Thus a molded article having a uniform appearance cannot be obtained. Particularly in case of a molded article non-uniform in the thickness, the appearance of the thick portion is quite different from that of the thin portion and the molded article is defective from an aesthetic viewpoint.

Starting from this background we made several investigations with a view to developing a resin composition capable of providing a molded article having excellent heat resistance and a relatively uniform appearance—even if the mold temperature is relatively low and the thickness of the molded article is small. As a result we found that these and other objects can be attained by incorporating definite amounts of a specific metal salt of an organic carboxylic acid and a specific ether compound into a glass fiber-reinforced polyethylene terephthalate resin, and that if a specific amount of one or more of liquid paraffins, solid paraffins and polyethylene waxes is incorporated into this resin composition containing the above-mentioned four components, a resin composition is provided having a very excellent, white and uniform appearance and a very high heat resistance. Further, in such compositions the molding temperature dependency and thickness dependency of the heat distortion temperature are substantially reduced.

DETAILED DESCRIPTION OF THE INVENTION

In accordance with the first fundamental aspect of the present invention, there is provided a reinforced resin composition having excellent heat resistance and appearance, which comprises (A) at least 30% by weight of a polyethylene terephthalate type resin, (B) about 5 to about 60% by weight of a glass fiber, (C) about 0.03 to about 5% by weight of at least one organic carboxylic acid salt of a selected metal belonging to the Groups I-a and II-a of the Periodic Table, and (D) about 0.1 to about 20% by weight of at least one ether compound represented by the following general formula (I):

$$R_1O\text{---}(R_2O)_n\text{---}R_3 \qquad (I)$$

in which $R_1$ and $R_3$ independently represent a hydrogen atom or a hydrocarbon group having from 3 to 30 carbon atoms, $R_2$ represents an alkylene group having 2 to 6 carbon atoms and n is an average number of recurring units in the range of from 5 to 200. Components (A) through (D) are admixed together so that the total amount of the components (A) through (D) is 100% by weight.

In accordance with the second aspect of the present invention, a reinforced resin composition having excellent heat resistance and appearance is provided, which comprises (A) at least 30% by weight of a polyethylene terephthalate type resin, (B) about 5 to about 60% by weight of a glass fiber, (C) about 0.03 to about 5% by weight of at least one organic carboxylic acid salt of a metal belonging to the Groups I-a and II-a of the Periodic Table, (D) about 0.1 to about 20% by weight of at least one ether compound represented by the following general formula (I):

$$R_1O\text{---}(R_2O)_n\text{---}R_3 \qquad (I)$$

in which $R_1$ and $R_3$ independently represent a hydrogen atom or a hydrocarbon group having from 3 to 30 carbon atoms, $R_2$ represents an alkylene group having 2 to 6 carbon atoms and n is an average number of the recurring units which is in the range of from 5 to 200, and (E) about 0.3 to about 5% by weight of at least one or more of liquid paraffins, solid paraffins and polyethylene waxes, components (A) through (E) being admixed so that the total amount of the components (A) through (E) is 100% by weight. The paraffin wax component gives the finished articles a pleasing uniform white appearance.

When a glass fiber-reinforced polyethylene terephthalate-type resin composition containing only the above-mentioned components (A) through (C) is molded at a low mold temperature into a molded article which is non-uniform in thickness, the thin portion of the resulting molded article is transparent or semi-transparent but the interior of the thick portion is whitened with the edge being transparent. Thus when only the resin, glass fiber and carboxylic acid salt of a metal are used a molded article uniform in appearance cannot be obtained. By contrast, the reinforced resin composition comprising specific amounts of the above-mentioned components (A) through (D) according to the first aspect of the present invention is characterized in that even if this composition is molded at low mold temperatures into a molded article of a non-uniform thickness, the defect of non-uniform appearance is eliminated and the gross appearance of not only the thin portion but also the thick portion in the resulting molded article is uniform. Furthermore, the reinforced resin composition containing the indicated amount of component (E), in addition to these components (A) through (D) according to the second aspect of the present invention, is characterized in that the reinforced resin composition can be molded into a molded article having a very excellent white, uniform appearance.

The reinforced resin compositions according to the present invention are further characterized in that the molding temperature dependency and thickness dependency of the heat distortion temperature of a molded article prepared therefrom can be substantially reduced and a molded article having a very high heat resistance can be obtained. We have found that an article made from a reinforced resin composition containing components (A) through (D) or (A) through (E) according to the present invention molded at a low molding temperature has a heat distortion temperature equivalent to that of a molded article obtained by molding at a mold temperature as high as 130° to 150° C.

As the polyethylene terephthalate-type resin component (A) that is used in the compositions present invention one may use linear ethylene terephthalate homopolymers having ethylene terephthalate units as recurring structural units, copolymers of ethylene terephthalate with a small amount of a comonomer copolymerizable therewith and blends of these homopolymers and copolymers. Polyethylene terephthalate resins prepared not only by an ester exchange reaction and subsequent polycondensation but also by direct esterification and subsequent polycondensation can be used in the present invention. In the present invention, it is preferred that the intrinsic viscosity $[\eta]$ of the polyethylene terephthalate resin be in the range of from 0.4 to 1.4. A polymer having a large intrinsic viscosity $[\eta]$ value can be obtained by further polymerizing a polymer obtained by the above-mentioned conventional procedure using a solid phase polymerization method. As used herein the intrinsic viscosity $[\eta]$ mentioned above is calculated from the viscosity of a solution of the polymer in a 50/50 (weight ratio) mixed solvent of phenol/tetrachloroethane at 25° C.

In the reinforced resin compositions of the present invention, the polyethylene terephthalate type resin (A) is incorporated in an amount of at least 30% by weight based on the total composition; if the amount of the component (A) is less than 30% by weight, the flow processability is reduced and poor results are obtained.

In the reinforced resin compositions of the present invention, the glass fiber (B) is incorporated in an amount of about 5 to about 60% by weight based on the total composition. If the amount of the glass fiber exceeds 60% by weight, the moldability and processability in the flowing condition are reduced, and if the amount of the glass fiber is less than 5% by weight, the glass fiber reinforcing effect is insufficient. The particular type of glass fiber or the method of its incorporation into the composition is not particularly critical to the present invention. Thus the glass fiber may be incorporated in the form of either a roving or a chopped strand. However, from the viewpoint of the productivity, it is preferred that the glass fiber be used in the form of a chopped strand. From the aspects of the operation adaptability at the mixing step and abrasion of the molding machine or breakage of the glass fiber at the molding step, it is especially preferred that a glass fiber having a fiber length of about 0.4 to about 6 mm be used. A satisfactory reinforcing effect is obtained if the fiber length of the glass fiber present in the final molded article is about 0.2 to about 2 mm. Commercially available products of surface-treated glass fibers can also be used in the present invention as commercially marketed.

The specific metal salt (C) of an organic carboxylic acid acts as a crystal nucleus for the polyethylene terephthalate-type resin (A) in the reinforced resin composition of the present invention. The metal salt component (C) is an organic carboxylic acid salt of a metal belonging to the Group I-a or II-a of the Periodic Table. Preferred metals include sodium, potassium, calcium and lithium. As the organic carboxylic acid one may use aliphatic carboxylic acids and aromatic carboxylic acids. Specific examples of the organic carboxylic acid metal salt include sodium laurate, potassium laurate, sodium myristate, potassium myristate, sodium stearate, potassium stearate, sodium octacosanoate, potassium octacosanoate, calcium myristate, calcium stearate, sodium benzoate, potassium benzoate, calcium benzoate, potassium terephthalate, sodium terephthalate and lithium terephthalate. Of these salts sodium stearate, sodium benzoate, potassium benzoate and lithium terephthalate are especially preferred.

These specific organic carboxylic acid metal salts may be used singly or in the form of a mixture of two or more of them, but in the present invention it is necessary that the organic carboxylic acid metal salt be present in an amount of 0.03 to 5% by weight based on the weight of the total composition. If the amount of the metal salt is less than 0.03% by weight, no substantial effect of either improving the heat resistance or appearance can be obtained. If the amount of the metal salt exceeds 5% by weight the molded article becomes brittle and unacceptable results are obtained.

The ether compound that is used as the component (D) of the reinforced resin composition is represented by the above-mentioned general formula (I). In the general formula (I), $R_1$ and $R_3$ stand for a hydrogen atom or a hydrocarbon group. The carbon structure of the hydrocarbon group is not particularly critical, but a hydrocarbon group having 3 to 30 carbon atoms is especially preferred. Most preferred is a hydrocarbon group having from 5 to 15 carbon atoms. $R_2$ stands for an alkylene group having 2 to 6 carbon atoms. Ethylene, propylene, butylene and neopentylene groups are preferred with an ethylene group being especially preferred.

In the general formula (I), the alkylene oxide structure $-(R_2O)_n$ may be an alkylene oxide structure composed of single alkylene oxide units or a copolymeric structure composed of different alkylene oxide units. The average number n of the recurring units is in the range of 5 to 200, preferably from 20 to 150. When the average number n is less than 5, reduction of the mechanical strength of the molded article is conspicuous and the effect of improving the appearance is reduced and thus only unacceptable results are obtained. When the average number n exceeds 200, the heat resistance is reduced and again only unacceptable results are obtained.

In the reinforced resin composition of the present invention the heat resistance of the molding is remarkably improved by incorporation of the ether compound represented by the general formula (I). However, some of the ether compounds included within general formula (I) tend to reduce the mechanical strength to some extent. We have found that in carrying out the present invention, if an ether compound of the general formula (I) in which $R_1$ is a hydrocarbon group represented by the following general formula (II):

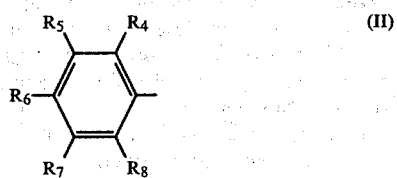

in which $R_4$ through $R_8$ represent a hydrogen atom or a hydrocarbon group having from 1 to 9 carbon atoms, $R_3$ is a hydrogen atom or a hydrocarbon group containing a benzene ring and n is in the range of from 20 to 150, is used as the component (D), a reinforced resin composition having a significantly improved heat resistance with no substantial reduction of the mechanical strength can be obtained. Accordingly, in the present invention, it is especially desirable to use a member of this preferred group of ether compounds.

Suitable ether compounds of the general formula (I) include polyethylene glycol, polyoxyethylene monooleyl ether, polyoxyethylene monostearyl ether, polyoxyethylene monolauryl ether, polyoxyethylene monononylphenyl ether, polyoxyethylene monooctylphenyl ether, polyoxyethylene distearyl ether and polyoxyethylene dinonylphenyl ether. In each such ether the average number n of recurring alkylene oxide units is from 5 to 200. Preferably one uses polyoxyethylene monononylphenyl ether, polyoxyethylene monooctylphenyl ether, polyoxyethylene dinonylphenyl ether or polyoxyethylene dioctylphenyl ether in which the average number n of recurring alkylene oxide units is from 20 to 150 and $R_1$ in the general formula (I) is a hydrocarbon group represented by the general formula (II) above.

According to the present invention the ether compounds represented by the general formula (I) may be used singly or two or more of them can be mixed together. However it is required that the ether compound of the general formula (I) be incorporated in an amount of 0.1 to 20% by weight into the molding composition. If the amount of the ether compound is less than 0.1% by weight, no substantial effect as to improving the heat resistance or the appearance in the final molded article can be obtained. If the amount of the ether compound is greater than 20% by weight the mechanical strength of the final molded article is reduced and unacceptable results are obtained.

In the second aspect of the present invention at least one liquid paraffin, solid paraffin or polyethylene wax is incorporated as the component (E) in addition to the above-mentioned components (A) through (D). Specific liquid paraffin that are suitable in the present invention include a liquid paraffin composed mainly of alkylnaphthenes which is obtained by highly purifying a spindle oil fraction. The solid paraffin that is used in the present invention is a crystalline paraffin composed mainly of normal paraffins. The melting point of the solid paraffin is not particularly critical, but it is preferred to use a solid paraffin having a melting point in the range of about 42 to about 60° C. A mixture of solid paraffins of different melting points may also be used in the present invention.

The molecular weight of the polyethylene wax that is used in the present invention is not particularly critical, but since a polyethylene wax having a molecular weight below 4000 exerts an especially high effect, use of such polyethylene wax is especially preferred. Among these liquid paraffin, solid paraffin and polyethylene wax materials, the solid paraffin is especially preferred because it exerts a highest effect of uniformalizing the appearance of the final molded article.

Mixtures of two or more of the liquid paraffin, solid paraffin and polyethylene wax may be used or only one of the three mentioned materials may be used. However it is necessary that component (E) be incorporated in an amount of about 0.3 to about 5% by weight based on the total composition. If the amount of the component (E) is less than 0.3% by weight, the effect of achieving a uniform appearance of the final molded article is low. If the amount of the component (E) is greater than 5% by weight, the mechanical strength of the final molded article is reduced and unacceptable results are obtained.

In the reinforced resin composition of the present invention it is necessary that both components (C) and (D) or each of components (C) through (E), as the case may be, be incorporated into the (A) (B) glass fiber-reinforced polyethylene terephthalate type resin composition. When any one component of the components (C) through (E) is incorporated singly into the glass fiber-reinforced polyethylene terephthalate type resin composition, the desirable effects such as those mentioned above cannot be obtained.

Various additives, for example fillers such as talc, mica, glass foil, clay and kaloin, light stabilizers, heat stabilizers, pigments and dyes may be incorporated into the reinforced resin composition of the present invention as may be required.

The reinforced resin composition of the present invention can be prepared using conventional procedures and equipment, for example, by mixing predetermined amounts of the components (A) through (D) or (A) through (E) in a tumbler or the like, and then injection molding the resulting mixture. Also the resulting mixture can be melt-kneaded and pelletized by an appropriate kneading machine such as an extruder, and then subjected to injection molding or compression molding, in which a molded article is obtained.

The present invention will now be described in detail with reference to the following Examples considered illustrative, not limiting, the scope of the invention.

EXAMPLES 1 THROUGH 28 AND COMPARATIVE EXAMPLES 1 THROUGH 5

The components (C) and (D) or (C) through (E), shown in Table 1, and a glass fiber, for convenience referred to as "GF", in the form of a chopped strand having a length of 3 mm as the component (B) were incorporated in amounts shown in Table 1 into an ethylene terephthalate homopolymer having an intrinsic viscosity [η] of 0.72. The polymer and glass fibers were homogeneously mixed in a twin-cylinder mixer for 5 minutes. The mixture was extruded and pelletized at a cylinder temperature of 260° to 280° C. in a vented extruder having a screw diameter of 30 mm to form a resin composition of the present invention.

Long strip test pieces having a size of 127 mm×12.7 mm×3.2 mm were prepared by molding the thus formed resin compositions at a cylinder temperature of 270° C. and a mold temperature of 40° C. for a molding cycle period of 65 seconds in an injection molding machine equipped with a 5-ounce screw 36 mm in the diameter. The heat distortion temperature, referred to as "HDT", was measured according to the method of ASTM D-648 ($\frac{1}{8}$", 264 psi) and the Dynstat flexural strength, referred to as "DFS", was measured according to the Dynstat test method of DIN 53452 using the test pieces so prepared. The appearance of the test pieces was also observed and evaluated. The results obtained are shown in Table 1.

For comparison, compositions containing the components in amounts outside the ranges specified in the present invention were molded in the same manner as described above. The HDT and DFS of the test pieces were measured and the appearance of the test pieces was observed and evaluated. The obtained results are also shown in Table 1.

In Table 1, the appearance was evaluated according to the following scale:

| | |
|---|---|
| X: | semi-transparent, even in the deep portion of the interior |
| Δ: | a large portion of the edge was transparent (interior was whitened) |
| O: | a small portion of the edge was transparent (interior was whitened) |
| ⊚: | the edge was not transparent |

From the results shown in Table 1, it will be understood that the reinforced resin compositions of the present invention provide a molded article having excellent heat resistance properties even when molding is carried out at a low mold temperature. It will also be apparent that if an ether compound containing an aromatic hydrocarbon group in at least one terminal thereof is used as the component (D), an especially excellent molded article, well-balanced in heat resistance and mechanical strength values, can be obtained.

TABLE 1

| | GF (% by weight) | Component (C) kind | Component (C) % by weight | Component (D) kind | Component (D) number n of recurring units | Component (D) % by weight | Component (E) kind | Component (E) % by weight | HDT (°C.) | DFS (Kg/cm²) | Appearance |
|---|---|---|---|---|---|---|---|---|---|---|---|
| Example 1 | 30 | sodium benzoate | 0.3 | polyoxyethylene monononylphenyl ether | 50 | 3 | solid paraffin (mp. = 42-44° C.) | 2 | 210 | 1870 | ⊚ |
| Example 2 | 30 | sodium stearate | 0.3 | polyoxyethylene monononylphenyl ether | 50 | 3 | solid paraffin (mp. = 42-44° C.) | 2 | 2024 | 1820 | ⊚ |
| Example 3 | 30 | sodium benzoate | 3.0 | polyoxyethylene monononylphenyl ether | 50 | 3 | solid paraffin (mp. = 42-44° C.) | 2 | 214 | 1700 | ⊚ |
| Example 4 | 30 | sodium benzoate | 0.3 | polyoxyethylene monononylphenyl ether | 50 | 15 | solid paraffin (mp. = 42-44° C.) | 2 | 213 | 1700 | ⊚ |
| Example 5 | 30 | sodium benzoate | 0.3 | polyoxyethylene monononylphenyl ether | 30 | 3 | solid paraffin (mp. = 42-44° C.) | 2 | 213 | 1800 | ⊚ |
| Example 6 | 30 | sodium benzoate | 0.3 | polyoxyethylene monononylphenyl ether | 80 | 3 | solid paraffin (mp. = 42-44° C.) | 2 | 214 | 1880 | ⊚ |
| Example 7 | 30 | sodium benzoate | 0.3 | polyoxyethylene monononylphenyl ether | 130 | 3 | solid paraffin (mp. = 42-44° C.) | 2 | 209 | 1860 | ⊚ |
| Example 8 | 30 | sodium benzoate | 0.3 | polyoxyethylene monooctylphenyl ether | 50 | 3 | solid paraffin (mp. = 42-44° C.) | 2 | 207 | 1800 | ⊚ |
| Example 9 | 45 | sodium benzoate | 0.3 | polyoxyethylene monononylphenyl ether | 50 | 15 | solid paraffin (mp. = 42-44° C.) | 2 | 220 | 1940 | ⊚ |
| Example 10 | 30 | sodium benzoate | 0.3 | polyoxyethylene monononylphenyl ether | 50 | 3 | liquid paraffin | 2 | 212 | 1850 | ⊚~○ |
| Example 11 | 30 | sodium benzoate | 0.3 | polyoxyethylene monononylphenyl ether | 50 | 3 | solid paraffin (mp. = 42-44° C.) | 0.5 | 209 | 1880 | ○ |
| Example 12 | 30 | sodium benzoate | 0.3 | polyoxyethylene monononylphenyl ether | 50 | 3 | solid paraffin (mp. = 60-62° C.) | 2 | 207 | 1820 | ⊚ |
| Example 13 | 30 | sodium benzoate | 0.3 | polyoxyethylene monononylphenyl ether | 50 | 3 | solid paraffin (mp. = 60-62° C.) | 8 | 204 | 1700 | ⊚ |
| Example 14 | 30 | sodium benzoate | 0.3 | polyoxyethylene monononylphenyl ether | 50 | 3 | polyethylene wax (m.w. = 2000) | 4 | 208 | 1800 | ⊚~○ |
| Example 15 | 30 | sodium benzoate | 0.3 | polyoxyethylene monononylphenyl ether | 50 | 3 | — | — | 213 | 1860 | ○ |
| Example 16 | 30 | sodium stearate | 0.3 | polyoxyethylene monononylphenyl ether | 50 | 3 | — | — | 207 | 1820 | ○ |
| Example 17 | 30 | sodium benzoate | 3.0 | polyoxyethylene monononylphenyl ether | 50 | 3 | — | — | 216 | 1720 | ○ |
| Example 18 | 30 | sodium benzoate | 0.3 | polyoxyethylene monononylphenyl ether | 50 | 15 | — | — | 214 | 1700 | ○ |
| Example 19 | 30 | sodium benzoate | 0.3 | polyoxyethylene monononylphenyl ether | 10 | 3 | — | — | 212 | 1620 | ○~△ |
| Example 20 | 30 | sodium benzoate | 0.3 | polyoxyethylene monononylphenyl ether | 80 | 3 | — | — | 213 | 1860 | ○ |
| Example 21 | 30 | sodium benzoate | 0.3 | polyoxyethylene monononylphenyl ether | 130 | 3 | — | — | 208 | 1870 | ○ |
| Example 22 | 30 | sodium benzoate | 0.3 | polyoxyethylene monononylphenyl ether | 180 | 3 | — | — | 184 | 1830 | ○ |
| Example 23 | 30 | sodium benzoate | 0.3 | polyoxyethylene monooctylphenyl ether | 50 | 3 | — | — | 205 | 1790 | ○ |
| Example 24 | 45 | sodium benzoate | 0.3 | polyoxyethylene monononylphenyl ether | 80 | 15 | — | — | 219 | 1930 | ○ |

TABLE 1-continued

| | GF (% by weight) | Component (C) kind | Component (C) % by weight | Component (D) kind | Component (D) number n of recurring units | Component (D) % by weight | Component (E) kind | Component (E) % by weight | HDT (°C.) | DFS (Kg/cm$^2$) | Appearance |
|---|---|---|---|---|---|---|---|---|---|---|---|
| Example 25 | 30 | sodium benzoate | 0.3 | polyoxyethylene mono-oleyl ether | 30 | 3 | — | — | 203 | 1460 | △ |
| Example 26 | 30 | sodium benzoate | 0.3 | polyethylene glycol | 10 | 3 | — | — | 194 | 1530 | ○~△ |
| Example 27 | 30 | sodium benzoate | 0.3 | polyethylene glycol | 130 | 3 | — | — | 178 | 1830 | ○ |
| Example 28 | 30 | sodium benzoate | 0.3 | polypropylene glycol | 30 | 3 | — | — | 183 | 1320 | △ |
| Comparative Example 1 | 30 | — | — | — | — | — | — | — | 87 | 1930 | × |
| Comparative Example 2 | 30 | sodium benzoate | 0.3 | — | — | — | — | — | 107 | 1840 | △ |
| Comparative Example 3 | 30 | — | — | polyoxyethylene mono-nonylphenyl ether | 50 | 3 | — | — | 85 | 1860 | × |
| Comparative Example 4 | 30 | sodium benzoate | 0.3 | polyethylene glycol | 3 | 3 | — | — | 211 | 820 | ○~△ |
| Comparative Example 5 | 30 | sodium benzoate | 0.3 | polyethylene glycol | 2000 | 3 | — | — | 111 | 1830 | × |

What is claimed is:

1. A reinforced resin composition exhibiting good heat resistance and appearance, which consists essentially of:
   (A) at least 30% by weight of a polyethylene terephthalate resin;
   (B) about 5 to about 60% by weight of glass fiber;
   (C) about 0.03 to about 5% by weight of at least one organic carboxylic acid salt of a metal of Groups I-a or II-a of the Periodic Table; and
   (D) about 0.1 to about 20% by weight of at least one ether compound of the formula:

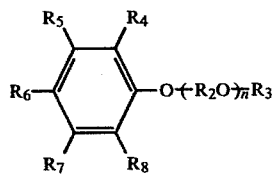

wherein $R_3$ is hydrogen or a hydrocarbon group having from 3 to 30 carbon atoms, $R_2$ is an alkylene group having 2 to 6 carbon atoms, $R_4$ through $R_8$ are independently hydrogen or a hydrocarbon group having from 1 to 9 carbon atoms, and n is an average number of the recurring units in the range of from 5 to 200, the components being admixed together so that the total amount of components (A) through (D) is 100% by weight.

2. The reinforced resin composition according to claim 1, wherein the amount of the component (A) is from 35 to 94.87% by weight and $R_2$ is $-CH_2CH_2-$.

3. The reinforced resin composition according to claim 1, wherein n of component (D) has a value in the range of from 20 to 150.

4. The reinforced resin composition according to claim 1, wherein the polyethylene terephthalate resin has an intrinsic viscosity in the range of from 0.4 to 1.4.

5. The reinforced resin composition according to claim 1, 2, 3 or 4, wherein the glass fiber has a fiber length of about 0.4 to about 6 mm.

6. The reinforced resin composition according to claim 1, 2, 3 or 4, wherein the metal is sodium, potassium, calcium or lithium.

7. The reinforced resin composition according to claim 1, wherein $R_2$ is ethylene, propylene, butylene or neopentylene.

8. The reinforced resin composition according to claim 1, 2, 3 or 4, wherein component (D) is polyoxyethylene monononylphenyl ether, polyoxyethylene monooctylphenyl ether or polyoxyethylene dinonylphenyl ether.

9. A glass fiber reinforced polyethylene terephthalate resin article molded from the composition of claim 1.

10. A reinforced resin composition exhibiting good heat resistance and appearance, which consists essentially of:
    (A) at least 30% by weight of a polyethylene terephthalate resin;
    (B) about 5 to about 60% by weight of glass fiber;
    (C) about 0.03 to about 5% by weight of at least one organic carboxylic acid salt of a metal of Groups I-a and II-a of the Periodic Table;
    (D) about 0.1 to about 20% by weight of at least one ether compound of the formula:

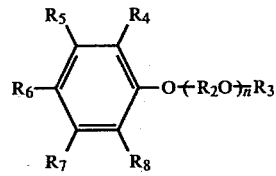

wherein $R_3$ is hydrogen or a hydrocarbon group having from 3 to 30 carbon atoms, $R_2$ is an alkylene group having 2 to 6 carbon atoms, $R_4$ through $R_8$ are independently hydrogen or a hydrocarbon group having from 1 to 9 carbon atoms, an n is an average number of the recurring units in the range of from 5 to 200;
and
    (E) about 0.3 to about 5% by weight of at least one liquid paraffin, solid paraffin, polyethylene wax or mixtures thereof, the components being admixed together so that the total amount of the components (A) through (E) is 100% by weight.

11. The reinforced resin composition according to claim 10, wherein n of component (D) is in the range of from 20 to 150.

12. The reinforced resin composition according to claim 10 or 11, wherein the polyethylene terephthalate resin has an intrinsic viscosity in the range of from 0.4 to 1.4.

13. The reinforced resin composition according to claim 10 or 11, wherein the glass fiber has a fiber length of about 0.4 to about 6 mm.

14. The reinforced resin composition according to claim 10 or 11, wherein the metal is sodium, potassium, calcium or lithium.

15. The reinforced resin composition according to claim 10, wherein $R_2$ is ethylene, propylene, butylene or neopentylene.

16. The reinforced resin composition according to claim 10 or 11, wherein component (D) is polyoxyethylene monononylphenyl ether, polyoxyethylene monooctylphenyl ether or polyoxyethylene dinonylphenyl ether.

17. A glass fiber reinforced polyethylene terephthalate resin article molded from the composition of claim 10.

* * * * *